(12) United States Patent
Earp et al.

(10) Patent No.: US 12,249,093 B2
(45) Date of Patent: Mar. 11, 2025

(54) SYSTEM AND METHOD FOR GEO-REFERENCING OBJECT ON FLOOR

(71) Applicant: DARVIS INC, San Francisco, CA (US)

(72) Inventors: Brian Earp, Merrimack, NH (US); Jan-Phillipp Mohr, Hamburg (DE)

( * ) Notice: Subject to any disclaimer, the term of this patent is extended or adjusted under 35 U.S.C. 154(b) by 269 days.

(21) Appl. No.: 17/681,291

(22) Filed: Feb. 25, 2022

(65) Prior Publication Data

US 2022/0277474 A1 Sep. 1, 2022

Related U.S. Application Data

(60) Provisional application No. 63/154,141, filed on Feb. 26, 2021.

(51) Int. Cl.
| | |
|---|---|
| *G06T 7/00* | (2017.01) |
| *G06T 7/246* | (2017.01) |
| *G06T 7/60* | (2017.01) |
| *G06T 7/73* | (2017.01) |

(52) U.S. Cl.
CPC ............... *G06T 7/73* (2017.01); *G06T 7/246* (2017.01); *G06T 7/60* (2013.01); *G06T 2207/30232* (2013.01)

(58) Field of Classification Search
CPC ............. G06T 7/73; G06T 7/246; G06T 7/60; G06T 2207/30232; G01C 11/04; G01C 21/383; G01C 21/3852; G01C 11/02
See application file for complete search history.

(56) References Cited

U.S. PATENT DOCUMENTS

| | | | |
|---|---|---|---|
| 11,113,879 B2* | 9/2021 | Núñez | G06T 7/73 |
| 11,252,329 B1* | 2/2022 | Cier | H04N 23/53 |
| 2019/0005719 A1* | 1/2019 | Fleischman | G06T 7/75 |

OTHER PUBLICATIONS

Hullo ("Multi-Sensor As-Build Models of Complex Industrial Architectures", Remote Sensing, vol. 7, 2015, pp. 16339-16362) (Year: 2015).*
Combined Search and Examination Report under Sections 17 and 18(3) issued for United Kingdom Patent Application GB2102821.2, on Dec. 14, 2021, 10 Pages.
François Hullo, Jean, et al., "Multi-Sensor As-Built Models of Complex Industrial Architectures", MDPI, Remote Sensing, Special Issue—Remote Sensed Data and Processing Methodologies for 3D Virtual Reconstruction and Visualization of Complex Architectures, vol. 07, Issue 12, Dec. 4, 2015, pp. 16339-16362.
Jo, Junghee, et al., "Geospatial Information System Based on Indoor Plan UKM", MDPI, Special Issue—Distributed and Parallel Architectures for Spatial Data, vol. 32, Issue 3, Aug. 30, 2020, pp. 539-549.

* cited by examiner

*Primary Examiner* — Ping Y Hsieh
(74) *Attorney, Agent, or Firm* — RC Trademark Company

(57) ABSTRACT

Disclosed is a system and a method for geo-referencing an object on a floor. The method comprises receiving a camera frame providing view of a section of the floor, receiving a detailed floor plan of the floor, selecting a first area from the section of the floor in which the object needs to be tracked and defining a plurality of reference points. Herein, at least one of the pluralities of reference points is close to a mid-point along one of corresponding axes of the first area. The method further comprises mapping the plurality of reference points to the floor plan, processing the camera frame to determine if the object has been placed in the first area and geo-referencing the one or more object in the floor plan if the object is determined to be placed in the first area.

8 Claims, 14 Drawing Sheets

| Point Location | Camera | | Georeferencing | | Actual | | Difference | | Distance |
|---|---|---|---|---|---|---|---|---|---|
| | X | Y | X | Y | X | Y | X | Y | |
| Point 1 | 741 | 558 | | | 565 | 772 | | | |
| Point 2 | 1784 | 984 | | | 773 | 1057 | | | |
| Point 3 | 438 | 1072 | | | 460 | 954 | | | |
| Point 4 | 452 | 610 | | | 470 | 784 | | | |
| Corner tape | 630 | 923 | 500 | 929 | 503 | 921 | -3 | 8 | 8.54 |
| Other small tape | 506 | 749 | 480 | 858 | 486 | 855 | -6 | 3 | 6.71 |
| X tape | 1518 | 994 | 696 | 1028 | 688 | 1012 | 8 | 16 | 17.89 |
| Blue tape upper left intersection | 1172 | 1046 | 602 | 1006 | 600 | 981 | 2 | 25 | 25.08 |
| Top left tape | 671 | 1063 | 501 | 969 | 504 | 958 | -3 | 11 | 11.40 |
| Top second left tape | 730 | 1047 | 513 | 970 | 517 | 957 | -4 | 13 | 13.60 |
| Top third left tape | 789 | 1034 | 525 | 972 | 532 | 957 | -7 | 15 | 16.55 |
| Second from left tape | 844 | 1023 | 537 | 974 | 540 | 957 | -3 | 17 | 17.26 |
| Second from left tape | 889 | 1009 | 549 | 975 | 554 | 957 | -5 | 18 | 18.68 |

| Point Location | Camera | | Georeferencing | | Actual | | Difference | | |
|---|---|---|---|---|---|---|---|---|---|
| | X | Y | X | Y | X | Y | X | Y | |
| Upper tape edge | 898 | 982 | 551 | 968 | 556 | 948 | -5 | 20 | 20.62 |
| Upper tape edge left | 870 | 991 | 545 | 968 | 548 | 948 | -3 | 20 | 20.22 |
| Black tape right edge | 612 | 827 | 501 | 897 | 505 | 888 | -4 | 9 | 9.85 |
| Black tape left edge | 587 | 832 | 495 | 897 | 499 | 889 | -4 | 8 | 8.94 |
| Box left edge | 607 | 632 | 513 | 809 | 519 | 805 | -6 | 4 | 7.21 |
| Box right edge | 751 | 614 | 559 | 810 | 559 | 805 | 0 | 5 | 5.00 |
| Box moved | 483 | 528 | 483 | 730 | 483 | 735 | 0 | -5 | 5.00 |
| Box moved up | 480 | 466 | 474 | 680 | 483 | 691 | -9 | -11 | 14.21 |

| #Reference Point | Combinations | Best Combinations | Highest Error | Sum of Error | Avg Error | Median Error | Std. Dev. |
|---|---|---|---|---|---|---|---|
| 4. | 5985 | [0,11,16,19] | 20.74 | 102.96 | 6.06 | 4.16 | 5.20 |
| 5. | 20349 | [0,3,6,10,20] | 21.86 | 89.99 | 5.62 | 4.02 | 5.71 |
| 6. | 54264 | [1,2,5,7,12,13] | 10.41 | 74.03 | 4.94 | 4.55 | 3.09 |
| 7. | 116280 | [1,2,7,12,13,18,20] | 7.46 | 59.33 | 4.24 | 4.21 | 2.51 |
| 8. | 203490 | [0,1,2,7,12,13,17,20] | 7.69 | 50.77 | 3.91 | 3.50 | 2.49 |
| 9. | 293930 | [0,1,2,3,6,7,10,13,14] | 8.30 | 43.81 | 3.65 | 3.11 | 2.36 |
| 10. | 352716 | [0,1,2,3,6,7,10,12,13,17] | 8.69 | 35.62 | 3.24 | 2.53 | 2.51 |
| 11. | 352716 | [0,1,2,3,6,7,8,10,12,13,14] | 6.45 | 28.20 | 2.82 | 2.36 | 1.92 |
| 12. | 293930 | [0,1,2,3,6,7,8,10,11,12,13,14] | 6.49 | 24.90 | 2.77 | 2.40 | 2.07 |
| 13. | 203490 | [0,1,2,3,6,7,8,10,12,13,14,17,20] | 4.05 | 20.26 | 2.53 | 2.59 | 1.13 |
| 14. | 116280 | [0,1,2,3,4,6,7,8,10,12,13,14,17,20] | 3.97 | 15.96 | 2.28 | 1.92 | 1.29 |

FIG. 7

SYSTEM AND METHOD FOR GEO-REFERENCING OBJECT ON FLOOR

TECHNICAL FIELD

The present disclosure relates generally to the field of locating or tracking objects and more specifically, to a system and a method for geo-referencing of an object on a floor.

BACKGROUND

Geo-referencing is a technique for mapping co-ordinates of an image to a geographical co-ordinate of the system. Herein, the image may be any digital image such as aerial images. The geo-referencing technique may take the image as the input and may add some geographical coordinates to it so that the image is mapped to coordinates of a real-world location. The geo-referencing technique may be used in a number of applications. For example, it may be used to get an exact location of an object being manufactured in a plant with respect to the co-ordinates of the plant. This may give an idea of the status of the object and how long the object stays in the plant. In order to do so, a plurality of cameras may be set up at different locations of the plant and the images from them may be analysed.

There are known techniques to process images of the object taken from different, unknown positions using a matching process in which points in different images which correspond to the same point of the actual object are matched, the matching points being used to determine the relative positions and orientations of cameras from which the images were taken and to then generate model data. However, such existing geo-referencing techniques are generally quite complex and may not provide geographical co-ordinate of the objects up to accuracy levels as may be demanded by some application areas.

Therefore, there exists a need to overcome the aforementioned drawbacks associated with techniques for geo-referencing objects.

SUMMARY

The present disclosure seeks to provide a method and a system for geo-referencing an object on a floor. An aim of the present disclosure is to provide a solution that overcomes at least partially the problems encountered in prior art, and to provide an improved system and method for geo-referencing the object on the floor. The present disclosure seeks to provide a solution to the existing problem of requiring manual calculation/calibration and poor accuracy of known techniques for geo-referencing an object on a floor.

Georeferencing in this invention refers to the process of mapping the camera frame to the physical dimensions of a floor plan. By measuring key distances between a visible object and the walls, then inputting those into the floor plan, the system learns to place all future object locations within the floor plan.

In an aspect, the present disclosure provides a method for geo-referencing an object on a floor, the method comprising:
  receiving a camera frame providing view of a section of the floor;
  receiving a detailed floor plan of the floor;
  selecting a first area from the section of the floor in which the object needs to be tracked;
  defining a plurality of reference points, wherein at least one of the plurality of reference points is close to a mid-point along one of corresponding axes of the first area;
  mapping the plurality of reference points to the floor plan;
  processing the camera frame to determine if the object has been placed in the first area; and
  geo-referencing the one or more object in the floor plan if the object is determined to be placed in the first area.

In another aspect, the present disclosure provides a system for geo-referencing an object on a floor, the system comprising a server arrangement configured to:
  receive a camera frame providing view of a section of the floor;
  receive a detailed floor plan of the floor;
  select a first area from the section of the floor in which the object needs to be tracked;
  define a plurality of reference points, wherein at least one of the plurality of reference points is close to a mid-point along one of corresponding axes of the first area;
  map the plurality of reference points to the floor plan;
  process the camera frame to determine if the object has been placed in the first area; and
  geo-reference the one or more object in the floor plan if the object is determined to be placed in the first area.

Embodiments of the present disclosure substantially eliminate or at least partially address the aforementioned problems in the prior art, and enable truthful geo-referencing of the object on the floor.

Additional aspects, advantages, features and objects of the present disclosure would be made apparent from the drawings and the detailed description of the illustrative implementations construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIG. 7 is an illustration of an exemplary table providing list of best combination of reference points from exemplary table of FIG. 6, in accordance with an embodiment of the present disclosure;

Figure 1:
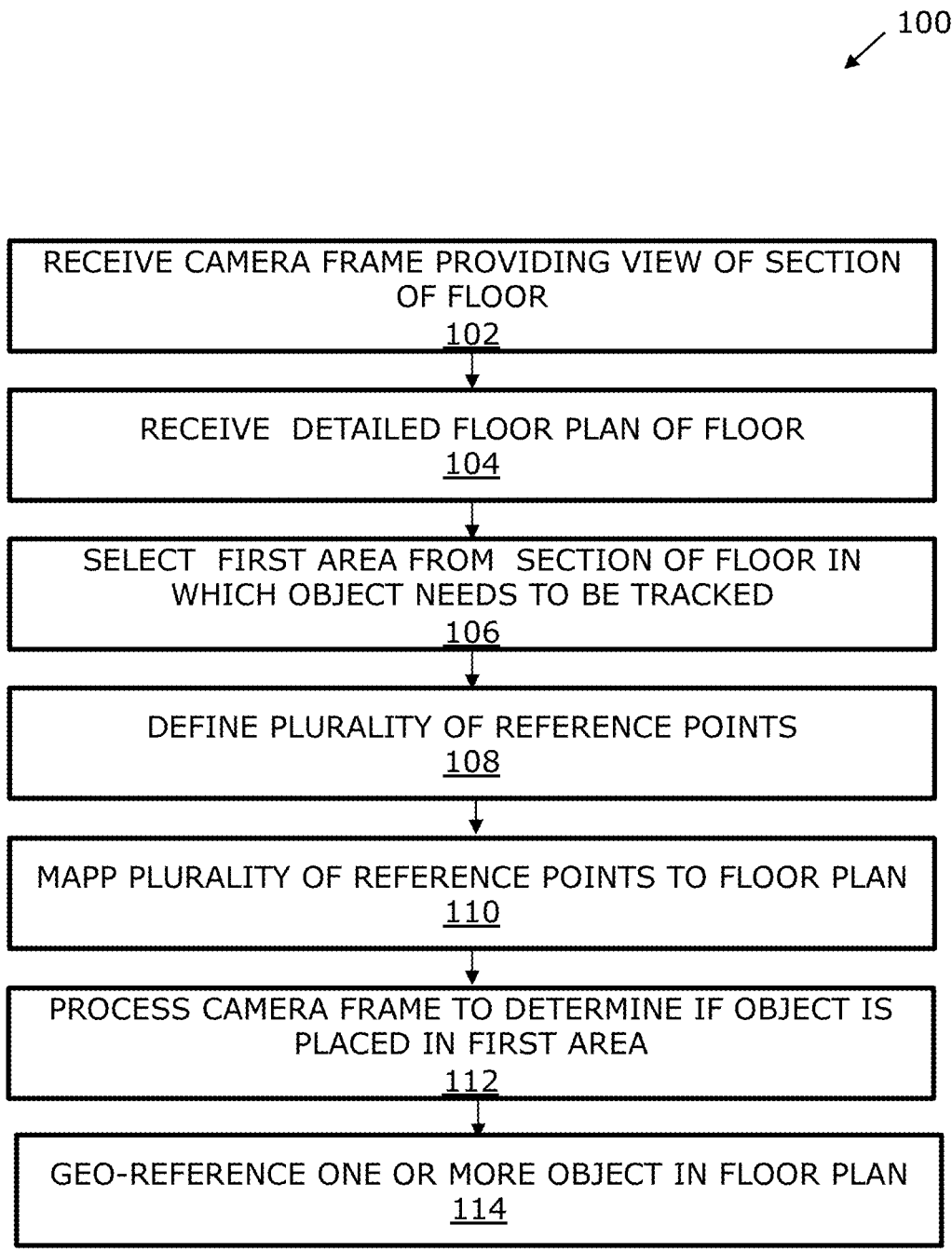
FIG. 1 is a flowchart of a method for geo-referencing an object on a floor, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In an aspect, the present disclosure provides method for geo-referencing an object on a floor, the method comprising:
receiving a camera frame providing view of a section of the floor;
receiving a detailed floor plan of the floor;
selecting a first area from the section of the floor in which the object needs to be tracked;
defining a plurality of reference points, wherein at least one of the plurality of reference points is close to a mid-point along one of corresponding axes of the first area;
mapping the plurality of reference points to the floor plan;
processing the camera frame to determine if the object has been placed in the first area; and
geo-referencing the one or more object in the floor plan if the object is determined to be placed in the first area.

In another aspect, the present disclosure provides a system for geo-referencing an object on a floor, the system comprising a server arrangement configured to:
receive a camera frame providing view of a section of the floor;
receive a detailed floor plan of the floor;
select a first area from the section of the floor in which the object needs to be tracked;
define a plurality of reference points, wherein at least one of the plurality of reference points is close to a mid-point along one of corresponding axes of the first area;
map the plurality of reference points to the floor plan;
process the camera frame to determine if the object has been placed in the first area; and
geo-reference the one or more object in the floor plan if the object is determined to be placed in the first area.

The present disclosure seeks to provide a method and a system for geo-referencing an object on a floor. It may be appreciated that geo-referencing may be a technique for mapping co-ordinates of an image to a geographical co-ordinate of the system. As used herein, the "object" may be any article whose geo-referencing needs to be done. As used herein, the "floor" may be a surface of a room, a hall and the like, in a facility where the object (to be tracked) is placed. As per the embodiments of the present disclosure, the object on the floor may be geo-referenced by mapping a camera frame to a physical dimension of a floor plan.

The present method for geo-referencing the object on the floor comprises receiving the camera frame providing view of a section of the floor. The camera frame may be an image of the section of the floor captured by a camera. It may be appreciated that often the floor may be large enough. In such cases, only the section of the floor may be captured by the camera. Herein, the camera may be any industry-standard security camera and preferably a 5MP 30 FPS camera, a H.265 camera or a H.264 camera, RTSP, 2.7~13.5 mm, 50M IR a WDR Pro or the like. In an embodiment, the camera may be wired to a server arrangement using a switch box. In another embodiment, the camera may be logged into a same network such as, a local area network (LAN) cable or a Wi-Fi that the server arrangement accesses. The camera may be configured to an image only setting or a video setting. In case, the camera captures video, the camera frame may be any one of the still images that makes up the video. In some examples, frames from multiple cameras may be stitched together to generate the camera frame without any limitations.

It may be noted that instead of the single camera, a plurality of cameras may be implemented. Such multiple cameras may be added from a navigation panel on an interface (as provided by the server arrangement in the system). In order to open the navigation panel an arrow next to the left side bar may be clicked to expand the navigation panel and navigate to different sections needed for configuration. The different sections may be a 'home' which is a main dashboard page, a 'cameras' which is used to add, configure and manage the plurality of cameras, a 'livestream' which is used to view the livestream of each camera and filter what is displayed on them, a 'settings' which is used to update password, configure project setup and control service, a 'history' for accessing all raw object location data, a 'logout' and a 'language' for choosing required language by clicking on a flag. In order to add the plurality of cameras, 'cameras' graphical user interface (GUI) may be opened from the navigation panel. Next 'camera' GUI may be clicked. A configuration window may appear. Information such as, camera name, camera IP address, username and password and camera frame width and height according to which the camera frames per second will populate may be automatically obtained. A test connection may be clicked.

Enable check box may be also clicked if the camera being added is used actively for tracking objects. If all information is correct the live view of the camera frame appears, otherwise the IP address, the username and the password may be checked for any typos. Finally, a next GUI may be clicked to add other cameras.

The present method for geo-referencing the object on the floor also comprises receiving a detailed floor plan of the floor. It may be appreciated that the floor plan may be a layout of property such as, but not limited to, a room, a home or a building as seen from above. For truthful geo-referencing of the object on the floor, the floor plan received may be detailed and may incorporate complete physical measurements. In the floor plan, large and mostly immobile objects within the floor may be identified to improve the accuracy of the method for geo-referencing the object. In an embodiment, the floor plan may be uploaded on the server arrangement in the system. Herein, a user may navigate to the interface such as, a project setup by clicking on the navigation panel bar followed by settings. The floor plan may be of jpeg, jpg or png format. In an embodiment, the floor plan may be simplified to display only walls, columns etc. in black colour on a white background. In another embodiment, apart from simplifying the floor plan, shapes for any large, non-moving objects such as, but not limited to, a large shelving unit may be added. The floor plan may be resized so that one pixel is equal to one square inch. This would make the method for geo-referencing simpler. In an example, as default, both X coordinate and Y coordinate may be equal to 0 inches in a top left corner of the floor plan.

The present method for geo-referencing the object on the floor further comprises selecting a first area from the section of the floor in which the object needs to be tracked. Herein, the first area is the area on the floor that is actually used for tracking and where geo-referencing is crucial. The selection of the first area corresponds to which part of the camera frame is the focus for tracking of the object. As discussed, in an embodiment, the floor may have portions where only non-moving objects may be placed. The geo-referencing and tracking of the object may not be necessary in such portions of the floor. It may be appreciated that if the whole of the floor is processed for tracking the object, it may take a considerable amount of time and resources. Hence, only the first area where the object may be tracked is selected, and portions where an object may unlikely be ever placed are ignored.

The present method for geo-referencing the object on the floor further comprises defining a plurality of reference points. Herein, at least one of the pluralities of reference points is close to a mid-point along one of corresponding axes of the first area. The plurality of reference points may be chosen to form a 'polygon' shape encompassing the first area. The polygon shape may allow the user to visually see a mapping between the camera frame and the floor plan. It may be noted that the choice in the pluralities of reference points helps to determine how the y-axis maps and how fast inches change as the object moves up a hallway in the floor, away from the camera.

Optionally, the plurality of reference points comprises at least four points. The four points in the plurality of reference points may not be selected randomly as the plurality of reference points have a high impact on an accuracy of the present method for geo-referencing the object on the floor. Hence, the four points so selected should be the most favourable four points for geo-referencing an object therein, as per the available information. It may be noted that when the plurality of reference points comprises at least four points, it may be best not to get the four corners of the camera frame. Instead, the first area that is actually used for tracking and where geo-referencing is crucial, may be concentrated on. Herein, points close to mid-points along the axes in the first area may be taken as the plurality of reference points. It is to be noted that the mid-points are chosen strategically to provide optimum mapping results. This is done by covering varying spaces to help establish a correlation between distance in pixels and distance down a hallway or floor being mapped. Selection of mid-points is particularly important when dealing with a camera depicting a sloping floor or is positioned at an unusual angle or tilt (e.g., security cameras are often placed at an angle and generally do not provide a perfect straight down view). In such cases, the number of pixels equating to the number of inches on the floorplan becomes variable. As most cameras are prone to inherent barrel distortion, mid-point selection should preferably cover those areas with such visible distortion which typically occurs at the left and right edges of a camera frame.

In addition, it is to be noted that the axes of the first area refer to the slope of the floor or hallway as depicted in the camera. The floor itself can be seen sloping as a "z-axis" in the 2-D camera frame. It is preferable to effectively add sufficient points to define the slope of that z-axis. This is because it determines by what rate the pixel to inch correlation changes between the camera frame and the floor plan.

It may be understood that, preferably, the plurality of reference points may be more than four, as an average distance error rate for geo-referencing the object goes down as the number of reference points in the plurality of reference points are increased.

The present method for geo-referencing the object on the floor further comprises mapping the plurality of reference points to the floor plan. The mapping of the plurality of reference points may comprise mapping the plurality of reference points in the camera frame to physical dimensions that may be in inches of the floor plan. Optionally, the method comprises processing the camera frame to determine one or more dimensions related to the first area by using at least two points defined in the first area with a known distance therebetween. The one or more dimensions may be physical dimensions, such as, but not limited to length, breadth, width and height of the target area. The one or more dimensions may be determined by using at least two points defined in the first area with the known distance between them.

In an embodiment, 3-dimensional (3D) modelling of the entire room using Matterport™ may be done to obtain the accurate floor plan of the entire room. Points on the 3D model may then be mapped to the camera frames, yielding mappings of at least fifty points per camera frame or more. Next two points with the known distance between them may be selected and may be used to determine one or more dimensions related to the first area.

In another embodiment, a flying drone having laser light may be used. The flying drone may map its location as it flies around the room. The laser sight is visible on the cameras and the plurality of reference points may be recorded automatically. The flying drone may project laser lights on two points either one by one or together at once. As distance between the two points is known, the one or more dimensions of the target area may be determined by taking the known distance as the reference.

In yet another embodiment, a large piece of paper with various markings on it that correspond in inches to a main X in the middle may be taken. Herein, X may be one of the points of the at least two points. Another point may be marked anywhere else on the paper. The distance between the two points may be known. It may be appreciated that more than two points with known distances between them may be also marked. The paper may be positioned at each reference point of the plurality of reference points one by one. By referring to the known distance, the one or dimensions may be determined. It may be contemplated that in order to determine the one or more dimensions easily the large piece of paper may be held parallel to a top wall which may enable mapping a great number of points for the cost of one.

In an implementation for the above embodiment, a person may be made to stand on the floor. Once the person may be visible in the camera frame, it will appear as a red dot with X and Y coordinates. Note that X and Y are both equal to 0 inches in the top left corner of the floor plan. One or more persons may be made to stand in the position of each corner of the selected first area. Next, the sheet of paper may be laid in that position aligned parallel to the top wall. A laser pointer aligned with the X in the middle of the paper may be used to take a measurement. The dimensions of the paper and the position of the middle may be noted. Using some arithmetic, a total of four reference points can be derived from the one middle point using this technique with increasing accuracy and decreasing setup time. The X and Y measurements may be inputted into the table for each of the points. This only works without needing to calculate anything if the floor plan is resized so that one pixel is equal to one square inch. It must be made sure to drag or input corresponding pixel coordinates in the camera frame as well. It is always possible to reconfigure mapped reference points after the initial setup. After configuring the selected first area, a 'next' may be clicked on the interface.

The present method for geo-referencing the object on the floor further comprises processing the camera frame to determine if the object has been placed in the first area. As the object to be geo-referenced may be placed in the first area, it will be detected in the camera frame using machine vision techniques as known in the art. The server arrangement may be configured to process the camera frame to determine if the object has been placed in the first area. It may be appreciated that the object may not be always present in the first area.

The present method for geo-referencing the object on the floor further comprises geo-referencing the one or more object in the floor plan if the object is determined to be placed in the first area. If the object is placed in the first area, the server arrangement may be configured to geo-reference the object. Herein, the geo-referencing may provide X and Y coordinates of the object with respect to the floor plan. That is, If the object is present, the geo-referencing of the done may be achieved, i.e. the location coordinates of the given object may be plotted on the given floor plan. As the one or more dimensions of the floor plan are known, the geo-referencing of the object may be done by simple mathematical calculations.

Optionally, the method further comprises obscuring one or more portions of the camera frame corresponding to a section of the floor other than the first area in the section of the floor. As discussed, camera frames may comprise immobile objects. Since, very likely, the object to be geo-referenced may not be placed in the section comprising such immobile objects, such sections may be obscured by blurring or whitening it. This may reduce the pixels to be processed and thus reduce the processing time for the server arrangement. Moreover, the obscuring may reduce the size of the camera frame that may help in reduction of transmission load, especially in low-bandwidth networks.

Portions of the camera frame that are duplicate with another overlapped camera are also obscured or blacked out. It is manually inspected and assessed if a part of the image is duplicated in another camera or not before obscuring it. Alternatively, such overlapping and duplication is detected by a georeferencing algorithm deployed in all cameras at varying pixel points to see the overlap on the floorplan accordingly.

It may be appreciated that, in an embodiment, an entire camera fleet comprising more than one camera may be set up to capture the floor. Some areas of the floor may be covered by multiple cameras but from different angles. Their camera frames may overlap. Obscuring may help in narrowing down the view of each camera to minimise redundant tracking and focus the view. In simple terms it is a process of cropping the camera frames. It may be noted that more focused camera frames are the more efficient the method and the system works. The obscuring may be done by clicking on 'live view' GUI in the navigation panel and then carefully analysing all the camera frames. If two or more camera's frames cover a same area such as, a hallway of the floor screenshots of the camera frames may be taken. In a tool such as PowerPoint®, the screenshots may be imported and may be rotated or mirrored as needed to overlap them into a continual view. The overlapping may make it clear as to which area needs to be cropped. Aside from overlapping camera frame sections, identify the first area and mark the section that may be ignored. For example, ceilings or empty walls may not be relevant for tracking of the object and may be cropped. Once a list of cameras that need to be obscured either due to overlapping or cropping is obtained, the user may return to the software or a website and click on the 'camera' in the navigation panel. Next, the user may click on a 'tool' icon of the camera that needs to be obscured to configure an obscuring mask GUI as on. The user may then click a 'Next' GUI twice. The user may then click on the camera frame to set a first corner of the polygon and move the mouse and click again on reaching subsequent corners. When the user is happy with the shape, 'enter' may be pressed. In order to define another shape, the user may click again. After all shapes are added, the user may see the camera frame with black boxes covering all irrelevant areas. The user may then click on a save and finish GUI. The process may be repeated for all cameras and the server arrangement may be restarted.

It may be noted that by measuring and mapping the plurality of reference points, an artificial intelligence (AI) model could be trained to place objects within the floor plan. That is, by measuring distances between a visible object and the walls, then inputting those, the AI model learns to place all future object locations within the floor plan. As discussed, this may be done by positioning the person with the laser point measuring device as well as a sheet of paper with the 'X' marked in the middle at the corners. However, in order to improve the AI models, more training footage may be provided. Specifically, a different set of footage for testing rather than for training may be provided which gives a true qualitative sense of state. Moreover, a real production site footage and not just select screenshots may be implemented. Such camera frames may be captured throughout an entire business day to account for and train against a variety of conditions.

Moreover, the present description also relates to the system for geo-referencing the object on the floor as described above. The various embodiments and variants disclosed above apply mutatis mutandis to the system for geo-referencing the object on the floor.

Optionally, the plurality of reference points comprises at least four points.

Optionally, the server arrangement is further configured to process the camera frame to determine one or more dimensions related to the first area by using at least two points defined in the first area with a known distance therebetween.

Optionally, the server arrangement is further configured to obscure one or more portions of the camera frame corresponding to a section of the floor other than the first area in the section of the floor.

Herein, a median accuracy level of the method and the system of the present disclosure may further be improved using the following approach. First, at least twenty mapped reference points per camera stream may be collected. The more the reference points the better. Second, an algorithm of the software may be executed that takes groups of reference points and runs through all possible combinations, determining the accuracy of each group and identifying the best possible reference point set. Third, a zoom level of a camera frame window is increased. This makes the selection of camera frame pixel coordinates much more accurate. Using such techniques, the system and the method of the present disclosure may be implemented for applications which require a five-inch accuracy at least 90% of the time, or even (when possible) a two-inch accuracy 90% of the time.

The method and the system are advantageous for geo-referencing the object on the floor. Despite the method increasing required configuration efforts, a highly accurate solution to meet the needs of various applications is offered. Additionally, ways to automate the mapping may further be derived. Using various techniques for the system and method of the present disclosure, overall 90th percentile which is average 90th percentile error across all cameras is obtained down to 2.85 inches. Accuracy of other techniques such as, RFID accuracy, is usually around 1-3 meters and is unsuitable for many application requirements despite its ease of use and setup. Moreover, the method and the system of the present disclosure takes into account human errors. The potential for human error when manually mapping the reference points has been identified. It could be minimised using a robotics approach. Even before that, two points may be permitted to be removed from consideration per camera frame when choosing best possible accuracy.

DETAILED DESCRIPTION OF THE DRAWINGS

Referring to FIG. 1, there is shown a flowchart 100 of a method for geo-referencing an object on a floor, in accordance with an embodiment of the present disclosure. The method comprises, at step 102, receiving a camera frame providing view of a section of the floor. The method comprises, at step 104, receiving a detailed floor plan of the floor. The method comprises, at step 106, selecting a first area from the section of the floor in which the object needs to be tracked. The method comprises, at step 108, defining a plurality of reference points. Herein, at least one of the pluralities of reference points is close to a mid-point along one of corresponding axes of the first area. The method comprises, at step 110, mapping the plurality of reference points to the floor plan. The method comprises, at step 112, processing the camera frame to determine if the object has been placed in the first area. The method comprises, at step 114, geo-referencing the one or more object in the floor plan if the object is determined to be placed in the first area.

Figure 2A:
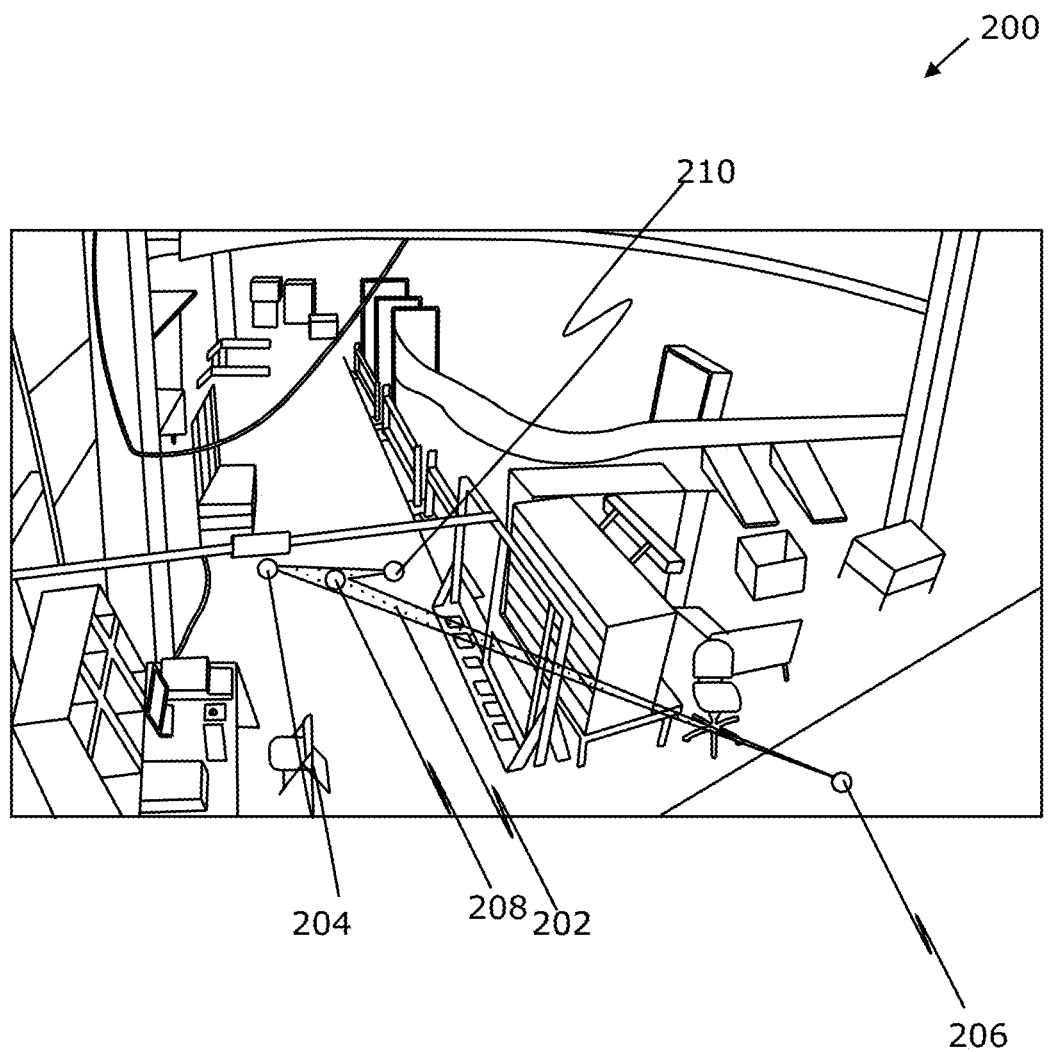
FIGS. 2A-2C are diagrammatic illustrations of a process for defining a plurality of reference points in a selected first area of the floor, in accordance with various embodiments of the present disclosure.
Figure 2B:
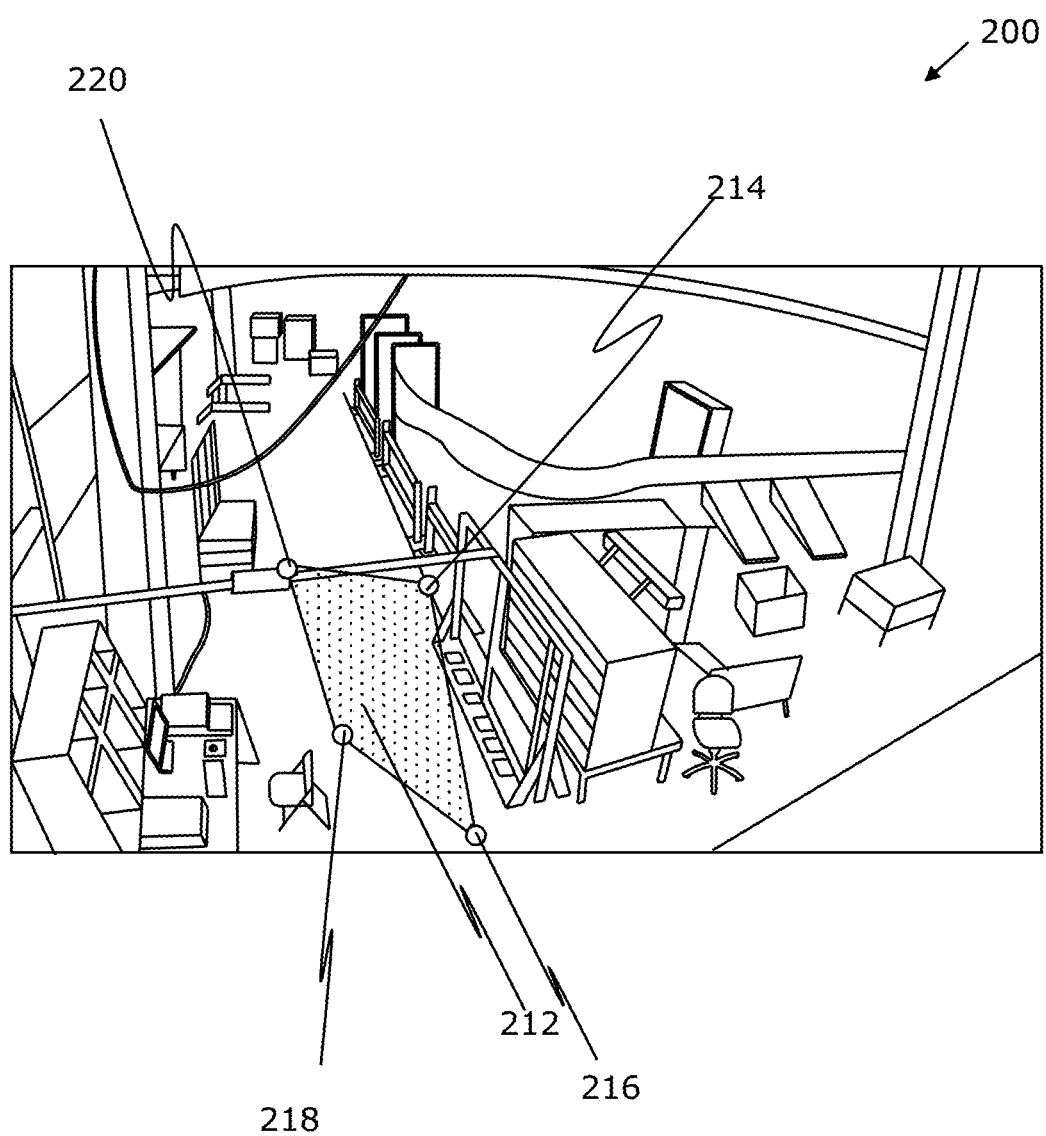
Figure 2C:
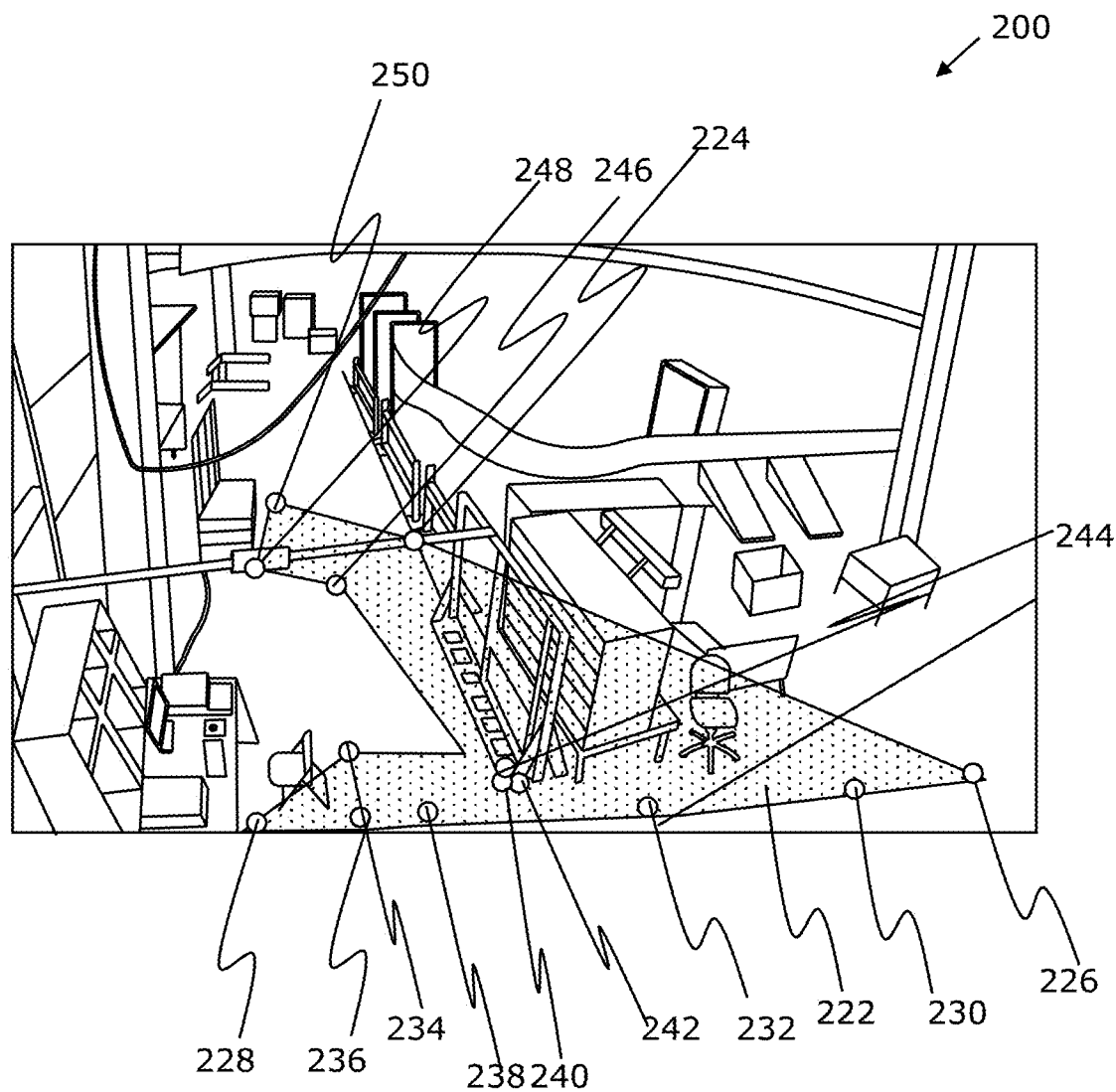

Referring to FIGS. 2A-2C, there are shown schematic illustrations of defining the plurality of reference points in the selected first area of the floor 200, in accordance with various embodiments of the present disclosure. Referring to FIG. 2A, the plurality of reference points 204, 206, 208 and 210 forms a polygon 202. It may be observed from FIG. 2A that the plurality of reference points 204, 206, 208 and 210 may be possibly a worst performing group of four points among exemplary polygons in FIGS. 2A-2C. Moreover, the polygon 202 covers almost no area and three reference points 204, 208 and 210 are close together. Referring to FIG. 2B, it can be observed that the plurality of reference points 214, 216, 218 and 220 forms a polygon 212. The plurality of reference points 214, 216, 218 and 220 are the best possible choice of four reference points as per exemplary polygons in FIGS. 2A-2C. The polygon 212 covers a larger area but does not cover a bottom left edge. The reference point 218 doesn't only define the corner of the polygon 212, but due to its y coordinate being roughly half-way between reference point 214 and 216 allows for artificial intelligence to learn how distances behave throughout the camera frame. It may be appreciated that if the reference point 218 was moved downward to be in level with reference point 216 accuracy would decrease. Referring to FIG. 2C, it can be observed that the plurality of reference points comprises fourteen reference points 224-250 and forms the polygon 222. The polygon 222 has greater area than other exemplary polygons 202 and 212 of FIGS. 2A and 2B.

Figure 3:
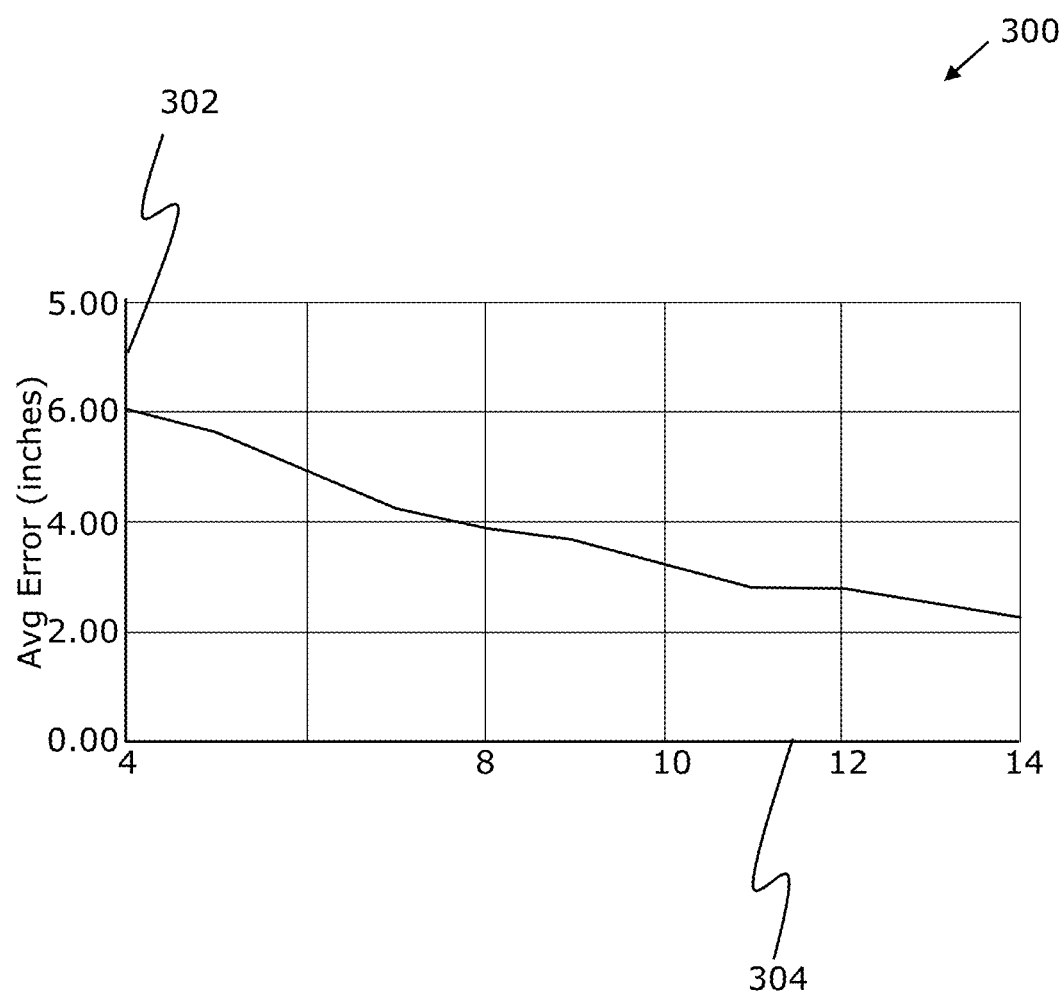
FIG. 3 is an illustration of an exemplary graph representing an average distance error rate versus a total number of reference points as achieved using the present method, in accordance with an embodiment of the present disclosure.

Referring to FIG. 3, there is shown an exemplary graph 300 representing an average distance error rate versus a total number of reference points as achieved using the present method, in accordance with an embodiment of the present disclosure. In the graph 300, the average error is plotted along y axis shown by 302 and the total number of reference points is taken along x axis shown by 304. The initial four reference points for the camera has a total error sum of 226.78 inches which may be calculated by combining how many inches each reference point was inaccurate into one sum. It may be inferred from the graph 300 that, best four reference points of all those available have the total error sum of 102.96 with the average distance error rate of 6.06 inches. Moreover, if the number of reference points is increased to fourteen and group of the fourteen reference points is optimized, the average distance error rate is reduced to 2.28.

Figure 4:
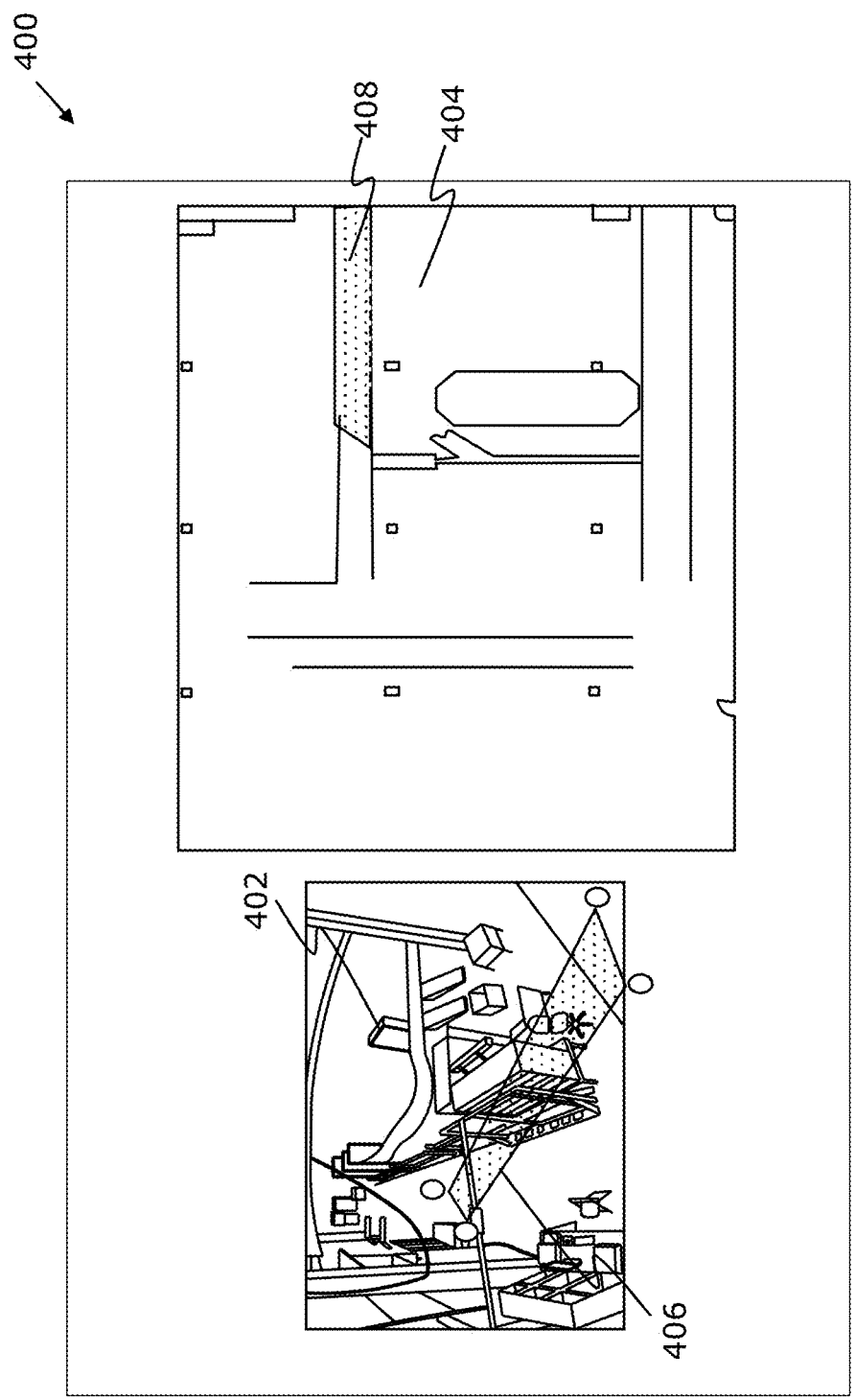
FIG. 4 is an illustration of an exemplary interface for mapping the plurality of reference points to a floor plan, in accordance with an embodiment of the present disclosure.

Referring to FIG. 4, there is shown an illustration of an exemplary interface 400 for mapping the plurality of reference points to the floor plan, in accordance with an embodiment of the present disclosure. The interface 400 depicts the camera frame 402 and the floor plan 404. Herein, the floor plan 404 is a detailed floor plan in order to verify any distances shown thereon which greatly reduces the risk of human measurement errors. The interface 400 has a first default box 406 in the camera frame 402 and a second default box 408 in the floor plan 404. To place default boxes 406 and 408 over the first area, each corner may be dragged to a desired position. This needs to be done for both the camera frame and the floor plan. Moving one default box 406 or 408 does not impact the position of the other. In order to increase accuracy, the polygon shape of the default boxes 406 and 408 may be made as detailed as possible by taking fourteen reference points.

Figure 5:
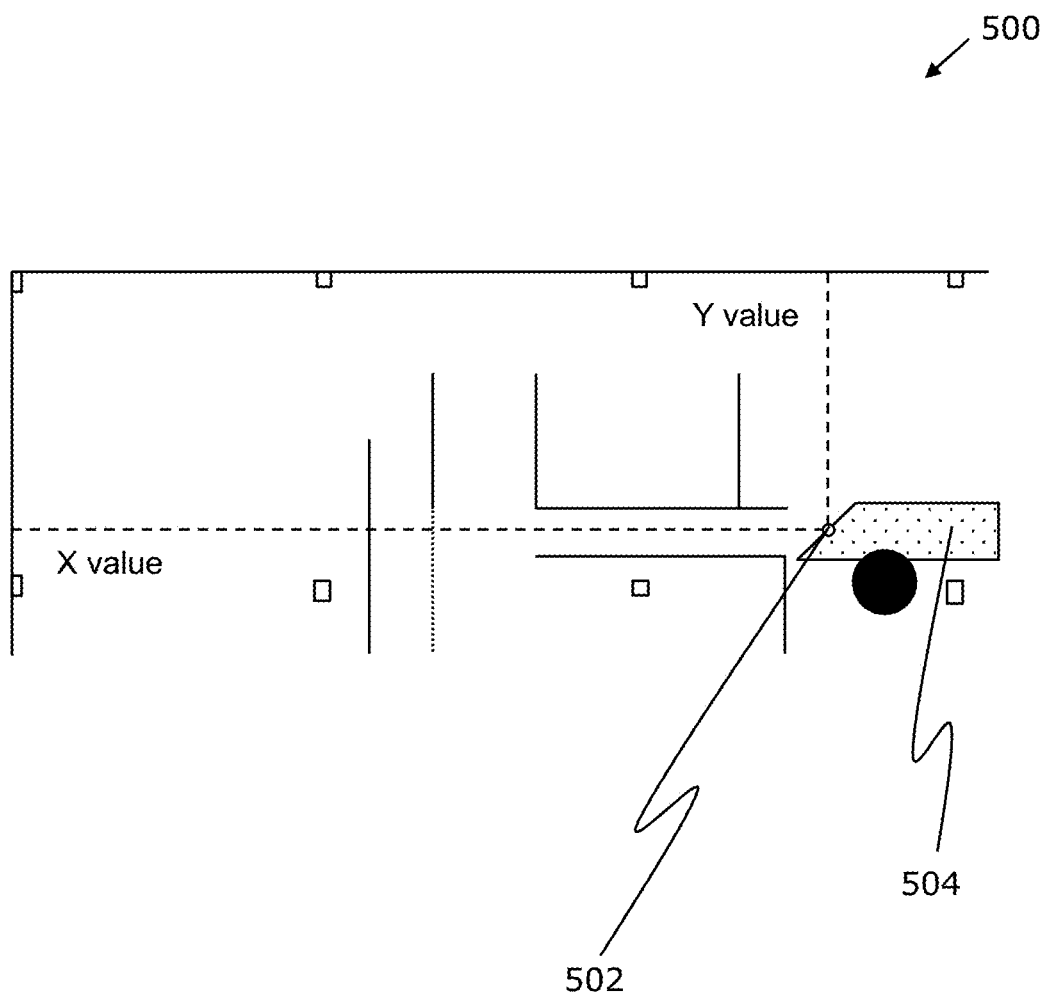
FIG. 5 is a diagrammatic illustration of a process for determining one or more dimensions related to the first area in a floor plan, in accordance with an embodiment of the present disclosure.

Referring to FIG. 5, there is shown a diagrammatic illustration of a process for determining one or more dimensions related to the first area in a floor plan 500, in accordance with an embodiment of the present disclosure. It may be seen that a given point 502 lies in a first area 504 of the floor plan 500. The X and Y coordinates value of the point 502 represent the distance from walls or the distance from the two sides of the floor plan 500.

Figure 6:
FIG. 6 is an illustration of an exemplary table for mapping points of an exemplary camera, in accordance with an embodiment of the present disclosure.

Referring to FIG. 6, there is shown an exemplary table 600 for mapping points of an exemplary camera, in accordance with an embodiment of the present disclosure. Herein, the camera taken into account is an exemplary camera '157' and the total number of points are twenty-one. In an example, referring to the table 600 of FIG. 6, an in-depth analysis and mapping is done on the camera '157'. Next, the mapping may be expanded to all cameras. Referring to the table 600, it may be observed that for the first four reference points a total error is 226.78" with the average distance error of 13.34". It may be observed from the table 600 that in total there may be at max twenty-one reference points. Best four reference points amongst twenty-one points may be determined using all combinations of twenty-one reference points taking four at a time. Thus, a total of 5985 combinations may be obtained. The combinations may be sorted to find a best possible combination which may be the best four reference points. In the present example, the best four reference points may be 0, 11, 16, and 19. This yields a total error of 102.96", average distance error of 6.06" and a highest error of 20.74". It may be observed that by choosing the best four reference points amongst twenty-one points error may be cut by more than half. Similarly, in order to find the best fourteen reference points from the twenty-one points, all combinations of twenty-one points with fourteen points considered at a time may be calculated. Thus, a total of 116280 combinations may be obtained. In the present example, the best fourteen reference points may be 0, 1, 2, 3, 4, 6, 7, 8, 10, 12, 13, 14, 17 and 20. This yielded the total error of 15.96", the average distance error of 2.28" and the highest error of 3.97". Similarly, the best combination taking five points, six points, seven points, eight points, nine points, ten points, eleven points, twelve points and thirteen points could be calculated.

Referring to FIG. 7, there is shown an exemplary table 700 comprising the best combination of reference points, in accordance with an embodiment of the present disclosure. Herein, the table 700 depicts the best combination of reference points taking four points, five points, six points, seven points, eight points, nine points, ten points, eleven points, twelve points, thirteen points and fourteen points of the table 600 of FIG. 6. Furthermore, the table 700 also provides the highest error, a sum of error, the average distance error, a median error and a standard deviation for each of the best combinations of reference points.

Figure 8:
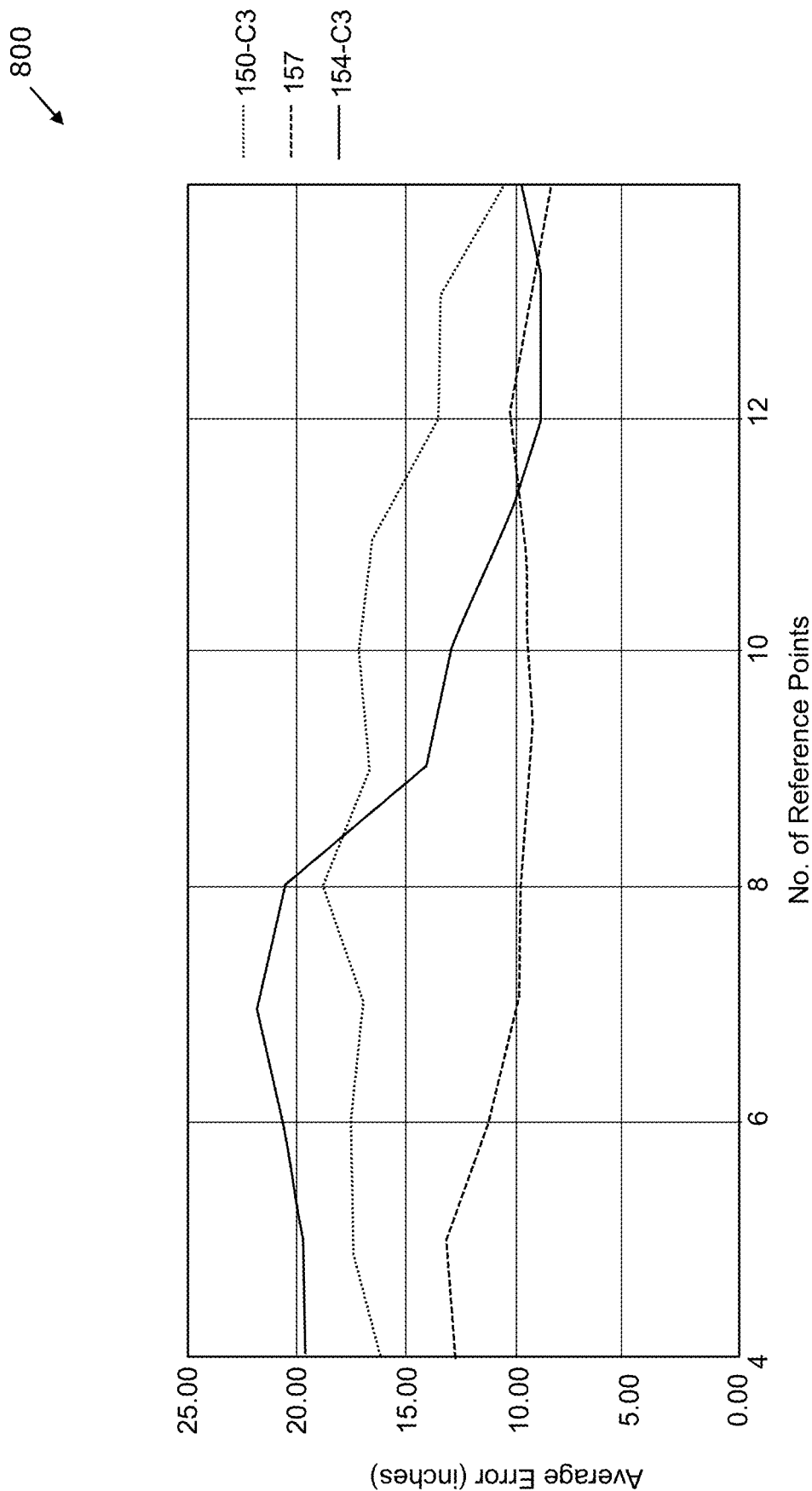
FIG. 8 is an illustration of an exemplary graph representing an average distance error rate versus the total number of reference points for a plurality of cameras, in accordance with an embodiment of the present disclosure.

Referring to FIG. 8, there is shown an illustration of an exemplary graph 800 representing an average distance error rate versus the total number of reference points for a plurality of cameras, in accordance with an embodiment of the present disclosure. It may be observed from FIG. 8 that for the majority of the cameras the accuracy is improved when a greater number of reference points are used.

Figure 9:
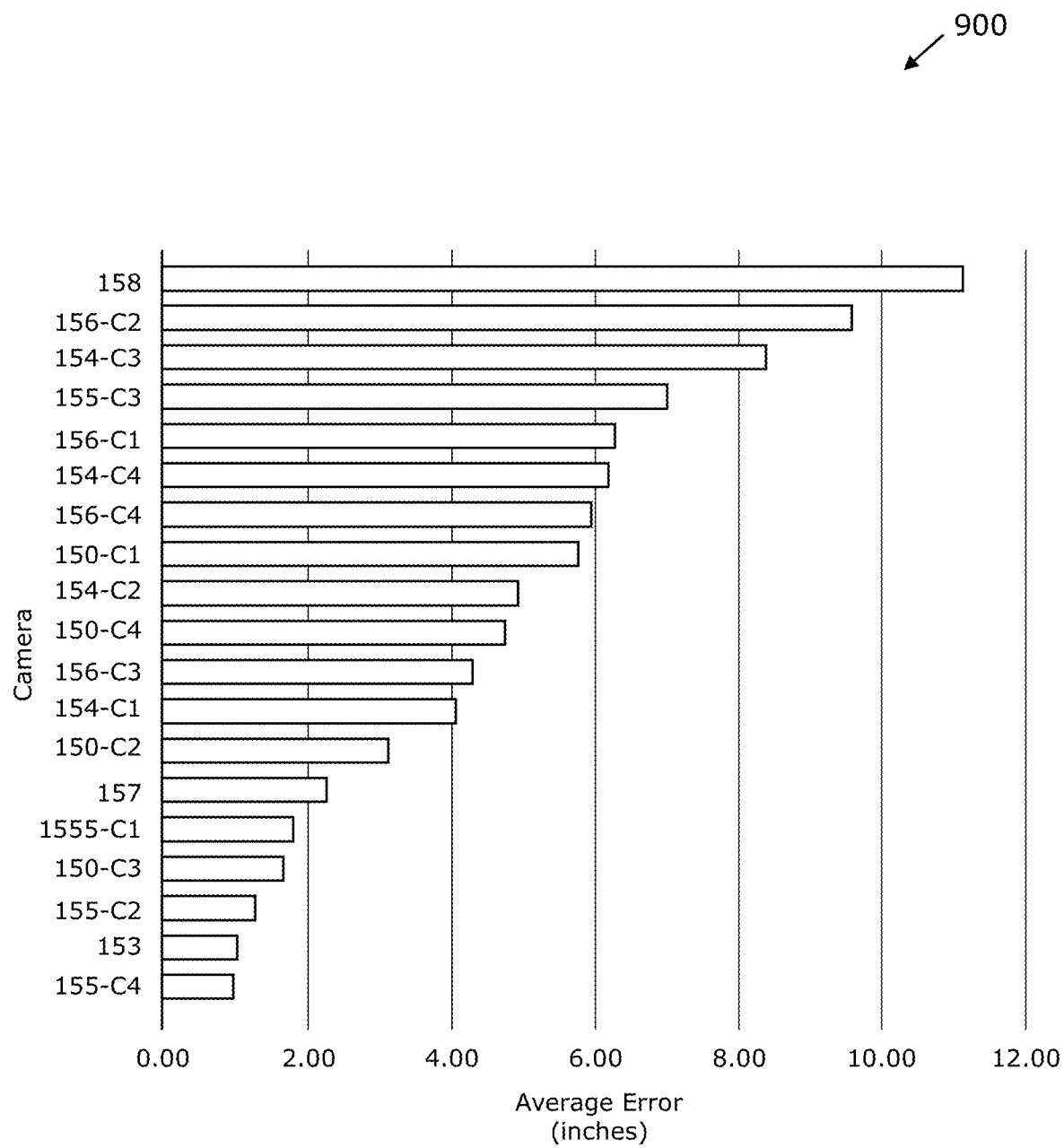
FIG. 9 is an illustration of an exemplary chart representing performance of a plurality of cameras when fourteen reference points are used, in accordance with an exemplary embodiment of the present disclosure.

Referring to FIG. 9, there is shown an illustration of an exemplary chart 900 representing performance of a plurality of cameras when fourteen reference points are used, in accordance with an exemplary embodiment of the present disclosure. The cameras are plotted along y axis and the average distance error rate is taken along x axis. The bars in the chart 900 are sorted by average distance error rate. It may be appreciated that longer the bar of the chart 900, worse is the accuracy. Based on the chart above, the worst performing camera is 158 and the best performing camera is 155-C4.

Figure 10:
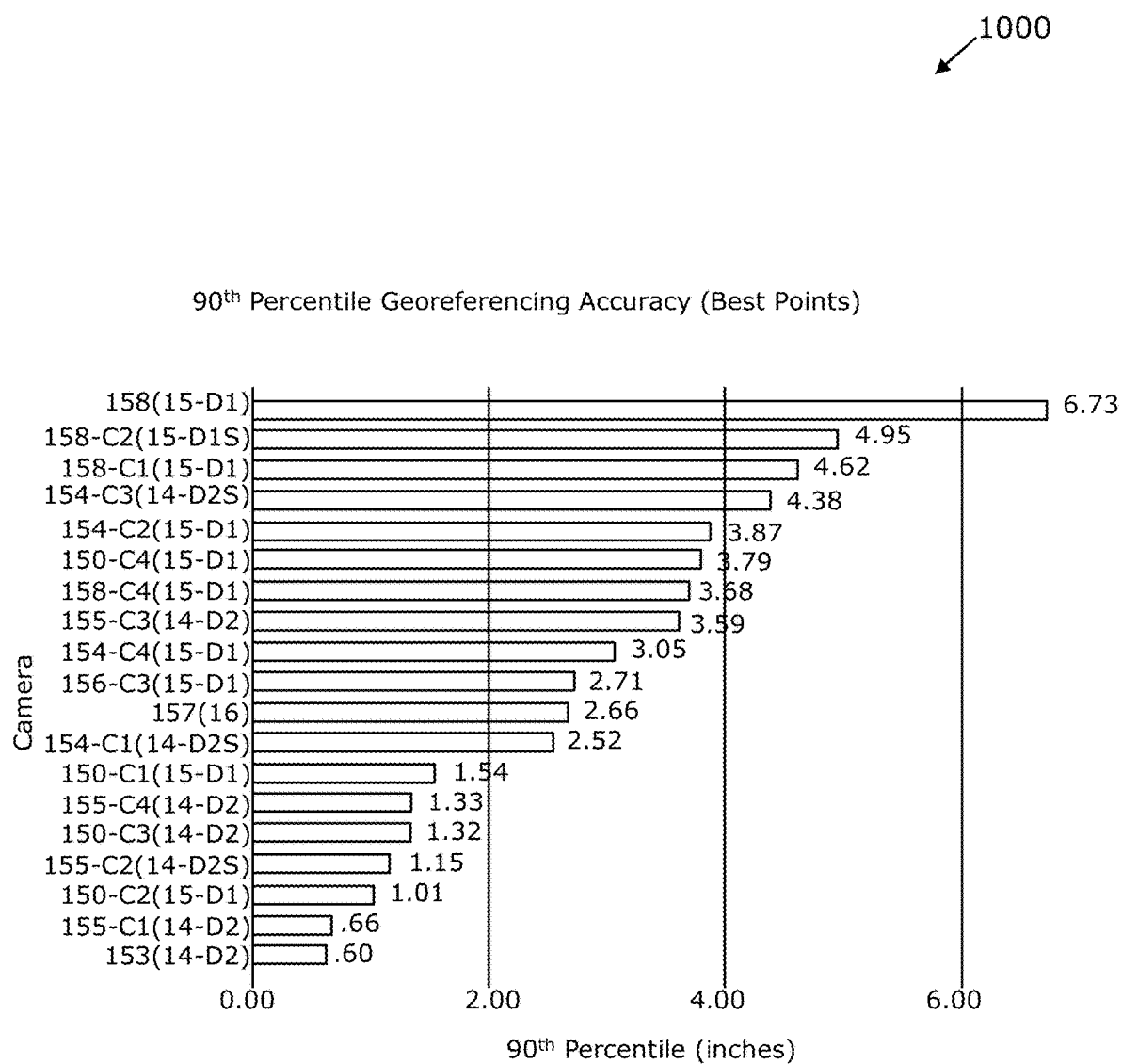
FIG. 10 is an illustration of an exemplary chart representing performance of each camera of FIG. 9 sorted by 90 percentiles, in accordance with an embodiment of the present disclosure.

Referring to FIG. 10, there is shown an illustration of an exemplary chart 1000 representing performance of each camera of FIG. 9 sorted by 90 percentiles, in accordance with an embodiment of the present disclosure. First, the reference points are increased a little more to fifteen and sixteen. Second, the worst performing point for datasets with fifteen reference points are dropped as designated in the chart 1000 as 15-D1. Third, the two worst performing points for datasets with fourteen reference points are dropped as designated in the chart 1000 as 14-D2. Fourth, the cameras are sorted by 90th percentile instead of by total error. This improved some numbers further while still being a fair assessment of accuracy. For such cameras a S will appear in the results. The fact that the camera 158 is the worst camera is hardly surprising as it includes a very long hallway. Additional points of camera 158 may be taken making a total of 43 points. Adding more points may resolve the inaccuracy. Camera 158's best four points have a 16.38" of accuracy based on the first twenty points which is reduced by 5" by increasing to fourteen points alone. Finally, it is reduced further to 6.73" at the $90^{th}$ percentile by throwing out one point and using fifteen points as reference points. Incorporating the remaining twenty-three points may prove useful. Despite camera 158, the overall accuracy is achieved. If the $90^{th}$ percentile values are averaged together across all cameras the overall accuracy of 2.85" is obtained which is well within the goal of 5".

Figure 11:
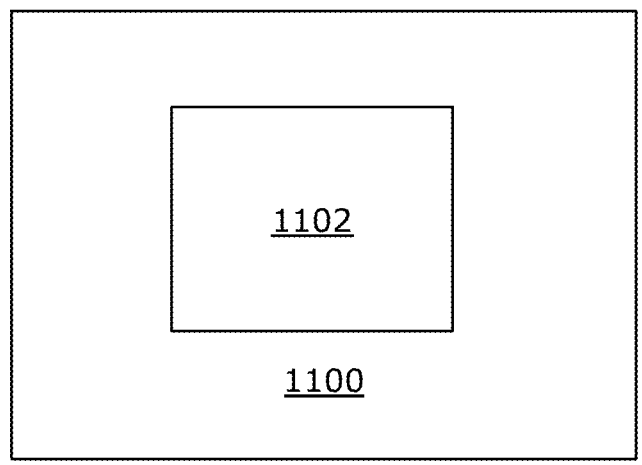
FIG. 11 is a schematic illustration of a system for geo-referencing the object on the floor, in accordance with an embodiment of the present disclosure.

Referring to FIG. 11, there is shown a schematic illustration of a system 1100 for geo-referencing the object on the floor, in accordance with an embodiment of the present disclosure. The system 1100 comprises a server arrangement 1102. The server arrangement 1102 is configured to receive the camera frame providing view of the section of the floor, receive the detailed floor plan of the floor, select the first area from the section of the floor in which the object needs to be tracked and define the plurality of reference points. Herein, at least one of the pluralities of reference points is close to a mid-point along one of corresponding axes of the first area. The server arrangement 1102 is further configured to map the plurality of reference points to the floor plan, process the camera frame to determine if the object has been placed in the first area and geo-reference the one or more object in the floor plan if the object is determined to be placed in the first area.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for geo-referencing an object on a floor, the method comprising:
 receiving a camera frame providing view of a section of the floor;
 receiving a detailed floor plan of the floor;
 selecting a first area from the section of the floor in which the object needs to be tracked;
 defining a plurality of reference points, wherein
  at least one of the plurality of reference points is close to a mid-point along one of corresponding axes of the first area, and
  the mid-point is chosen based on a correlation between pixel distance and distance on the floor plan;

mapping the plurality of reference points to the floor plan;
processing the camera frame to determine if the object has been placed in the first area; and
geo-referencing the one or more object in the floor plan if the object is determined to be placed in the first area.

2. A method according to claim 1, wherein the plurality of reference points comprises at least four points.

3. A method according to claim 1 further comprising processing the camera frame to determine one or more dimensions related to the first area by using at least two points defined in the first area with a known distance therebetween.

4. A method according to any of preceding claims further comprising obscuring one or more portions of the camera frame corresponding to a section of the floor other than the first area in the section of the floor.

5. A system for geo-referencing an object on a floor, the system comprising a server arrangement configured to:
receive a camera frame providing view of a section of the floor;
receive a detailed floor plan of the floor;
select a first area from the section of the floor in which the object needs to be tracked;
define a plurality of reference points, wherein
at least one of the plurality of reference points is close to a mid-point along one of corresponding axes of the first area, and
the mid-point is chosen based on a correlation between pixel distance and distance on the floor plan;
map the plurality of reference points to the floor plan;
process the camera frame to determine if the object has been placed in the first area; and
geo-reference the one or more object in the floor plan if the object is determined to be placed in the first area.

6. A system according to claim 5, wherein the plurality of reference points comprises at least four points.

7. A system according to claim 5, wherein the server arrangement is further configured to process the camera frame to determine one or more dimensions related to the first area by using at least two points defined in the first area with a known distance therebetween.

8. A system according to any of claims 5 to 7, wherein the server arrangement is further configured to obscure one or more portions of the camera frame corresponding to a section of the floor other than the first area in the section of the floor.

* * * * *